United States Patent [19]

Hayashi et al.

[11] Patent Number: 4,600,094

[45] Date of Patent: Jul. 15, 1986

[54] AUTOMATIC VENDING MACHINE WITH ROTATIONAL DISPENSING FUNCTION

[75] Inventors: Yukichi Hayashi; Eiji Itako, both of Sakado; Masahiro Yasuhara, Tsurugashimamachi, all of Japan

[73] Assignee: Kabushiki Kaisha Nipponcoinco, Tokyo, Japan

[21] Appl. No.: 708,793

[22] Filed: Mar. 6, 1985

[30] Foreign Application Priority Data

Mar. 9, 1984 [JP] Japan .................................. 59-43980

[51] Int. Cl.[4] ........................ G07F 11/04; B65G 59/06

[52] U.S. Cl. ........................................ 194/217; 221/2; 221/9; 221/112; 221/129

[58] Field of Search ................... 194/2, 10; 221/9, 10, 221/2, 6, 112, 114, 129; 364/464, 479; 186/35, 38; 414/266, 268, 270, 285

[56] References Cited

U.S. PATENT DOCUMENTS

| | | | |
|---|---|---|---|
| 3,240,386 | 3/1966 | McCloy | 221/129 X |
| 3,831,806 | 8/1974 | Lindsey | 221/129 X |
| 3,836,046 | 9/1974 | Bowman | 194/10 X |
| 4,381,835 | 5/1983 | Shah et al. | 364/479 X |

*Primary Examiner*—Joseph J. Rolla

*Assistant Examiner*—Edward S. Ammeen

*Attorney, Agent, or Firm*—Koda and Androlia

[57] ABSTRACT

Identical products are stored in a plurality of columns. Dispensing product numbers of the respective columns are calculated in accordance with the numbers of products stored in the respective columns. The calculated dispensing product numbers are set in corresponding counters. The counters are decremented every time a product or products is/are dispensed from each column. When all the counts of the counters are set to "0", the calculated dispensing product numbers are set again in the corresponding counters, and the above operation is repeated, thereby dispensing the products on the FIFO basis.

3 Claims, 5 Drawing Figures

FIG. 2-A
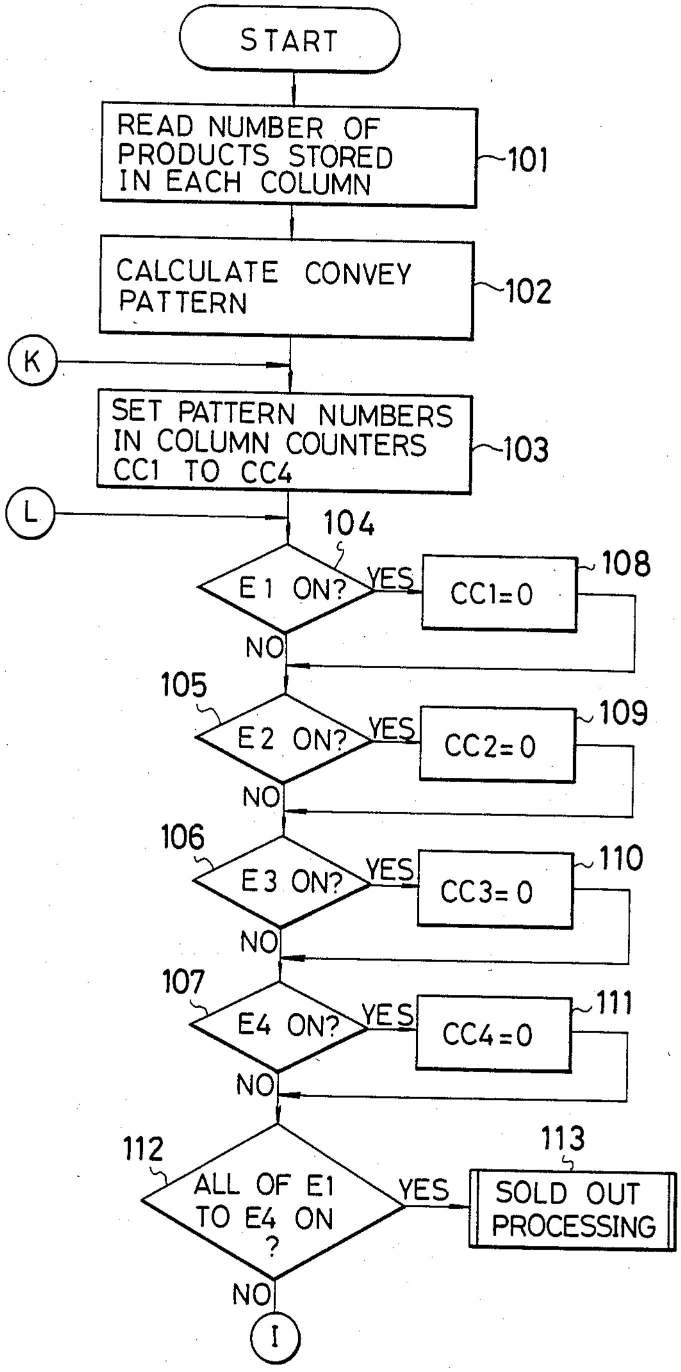

FIG.2-B
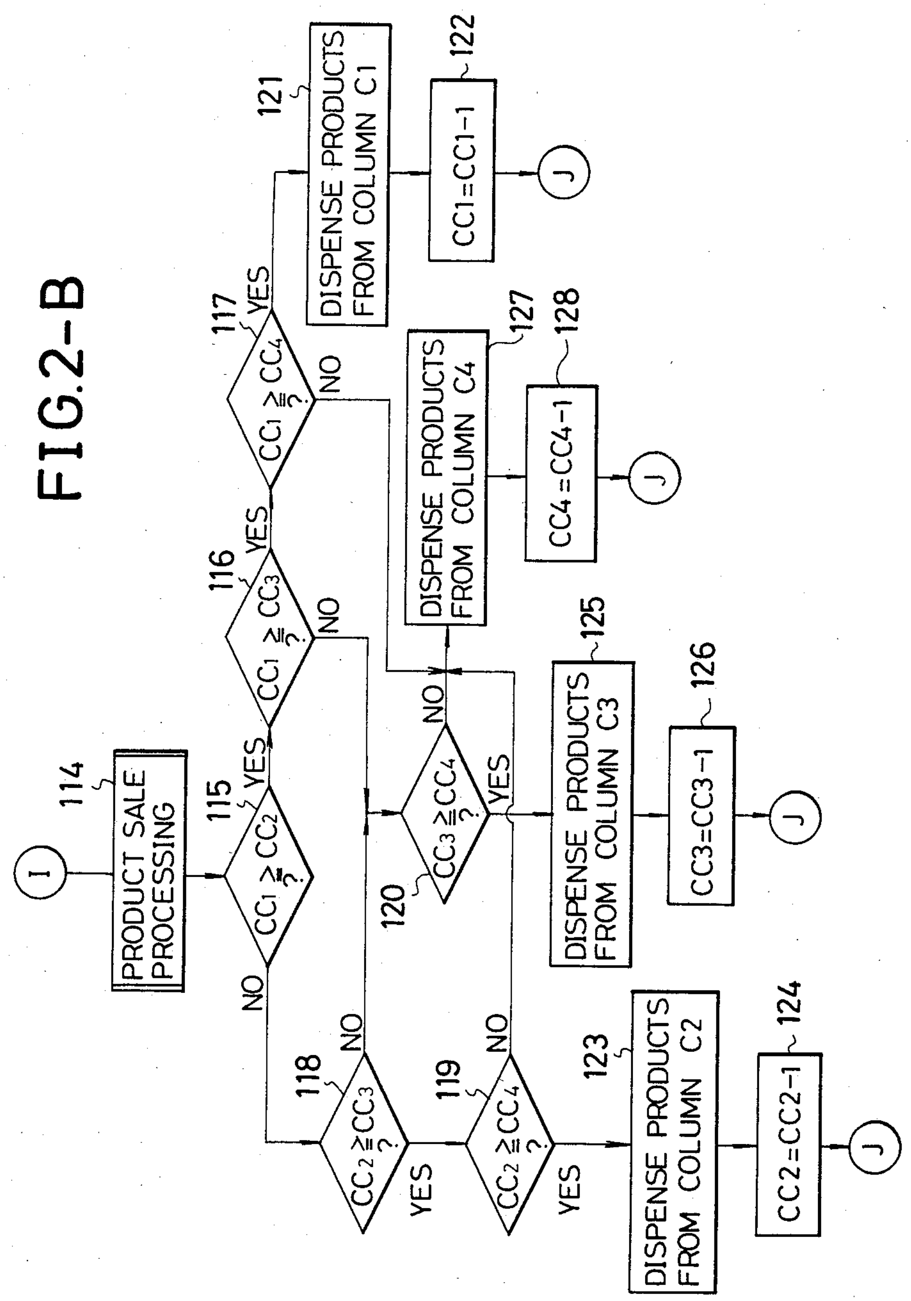

FIG. 2-C
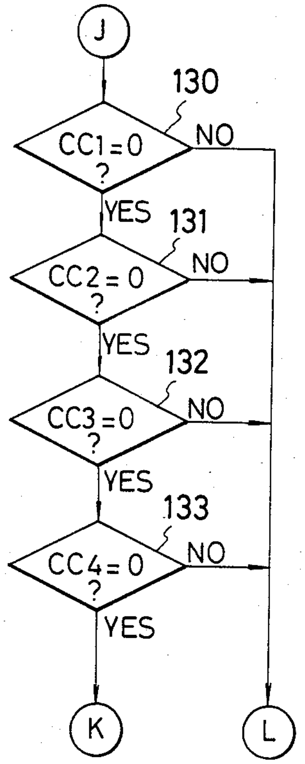
FIG. 3
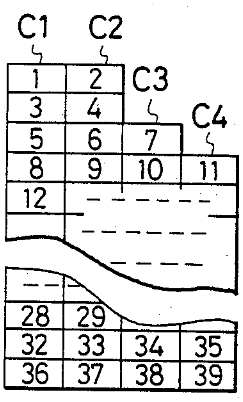

AUTOMATIC VENDING MACHINE WITH ROTATIONAL DISPENSING FUNCTION

BACKGROUND OF THE INVENTION

1. Field of the Invention

The present invention relates to an automatic vending machine for dispensing products equally from a plurality of columns.

2. Description of the Prior Art

Demand has arisen for selling products on the first-in, first-out (FIFO) basis in automatic vending machines. In particular, when products sold as cold or hot products are dispensed on the last-in, first-out (LIFO) basis, the products may not be sufficiently cooled or heated. Therefore, products are sold from automatic vending machines on the FIFO basis.

In a conventional automatic vending machine adopting the FIFO system, identical products at a single price are stored in a plurality of columns and are equally dispensed from the machine on the FIFO basis. In this type of automatic vending machine, the products are alternately dispensed from two columns or in rotation from a plurality of columns. However, when product numbers vary in the respective columns, products in a specific column may be sold out. A method is then adopted for dispensing the products in proportion to the product numbers of the respective columns. For example, when the products are dispensed from columns which store 100, 80 and 70 products, 10, 8 and 7 products are respectively dispensed from the columns.

In a conventional automatic vending machine selling cooled or heated products, a cooling or heating portion is located at the lower portion of the automatic vending machine so as to efficiently cool or heat the products near the dispensing port. In order to dispense the products in proportion to the product numbers of the respective columns, since 10, 8 and 7 products are dispensed from the first to third columns, the products dispensed from the first column are not sufficiently cooled or heated compared with the products dispensed from the second or third column, resulting in inconvenience.

SUMMARY OF THE INVENTION

The present invention has been made to resolve the conventional problem described above, and has as its object to provide an automatic vending machine with a rotational dispensing function, wherein identical products at a single price can be equally dispensed from a plurality of columns, and previously stored products are dispensed first as far as possible.

In order to achieve the above object of the present invention, there is provided an automatic vending machine for dispensing identical products having a single price in rotation from a plurality of columns, comprising: setting means for respectively setting product numbers of the plurality of columns in accordance with the numbers of products stored in the plurality of columns; dispensing pattern calculating means for calculating dispensing product numbers of the plurality of columns in accordance with the product numbers set by the setting means; down counters which are preset with values respectively corresponding to the dispensing product numbers calculated by the dispensing pattern calculating means and which are respectively decremented every time the products are dispensed from the plurality of columns; discriminating means for comparing counts of the down counters and discriminating one of the down counters which has a maximum value; dispensing means for dispensing the products from a column corresponding to one of the down counters which is discriminated to have the maximum value by the discriminating means; detecting means for detecting zero counts of all the down counters; and resetting means for resetting the values calculated by the dispensing pattern calculating means in the down counters in response to an output from the detecting means, whereby when the product numbers of the respective columns are set by the setting means, the dispensing product pattern of the respective columns can be calculated by the dispensing pattern calculating means substantially in proportion to the numbers of products stored in the respective columns, the calculated values are set in the down counters of the respective columns, the counts of the down counters are compared by the discriminating means, and the column corresponding to the down counter having the maximum value is discriminated; and when a product dispensing instruction is entered, the products are dispensed from the column corresponding to the down counter having the maximum value, and the counter having the maximum value is decremented by one. Similarly, every time the product dispensing instruction is entered, the products are dispensed from the column corresponding to the down counter currently having the maximum value, and this down counter is decremented by one. When the counts of all the down counters are zero, the numbers calculated by the dispensing pattern calculating means are respectively set in the down counters again, and thereafter the above operation is repeated.

According to the present invention, the dispensing product numbers of the respective columns for each dispensing pattern are calculated substantially in proportion to the numbers of products stored in the columns. By using this dispensing pattern, the products are sequentially dispensed from the columns currently having maximum products. In this manner, the products can be equally dispensed from the plurality of columns. At the same time, the products located in the lower portion of the column in the automatic vending machine, i.e., sufficiently cooled or heated products are first dispensed.

BRIEF DESCRIPTION OF THE DRAWINGS

FIGS. 2-A, 2-B and 2-C are respectively flow charts for explaining the operation of the controller shown in FIG. 1; and FIG. 3 is a table for explaining dispensing in one dispensing pattern in the controller shown in FIG. 1.

DETAILED DESCRIPTION OF THE PREFERRED EMBODIMENT

Figure 1:
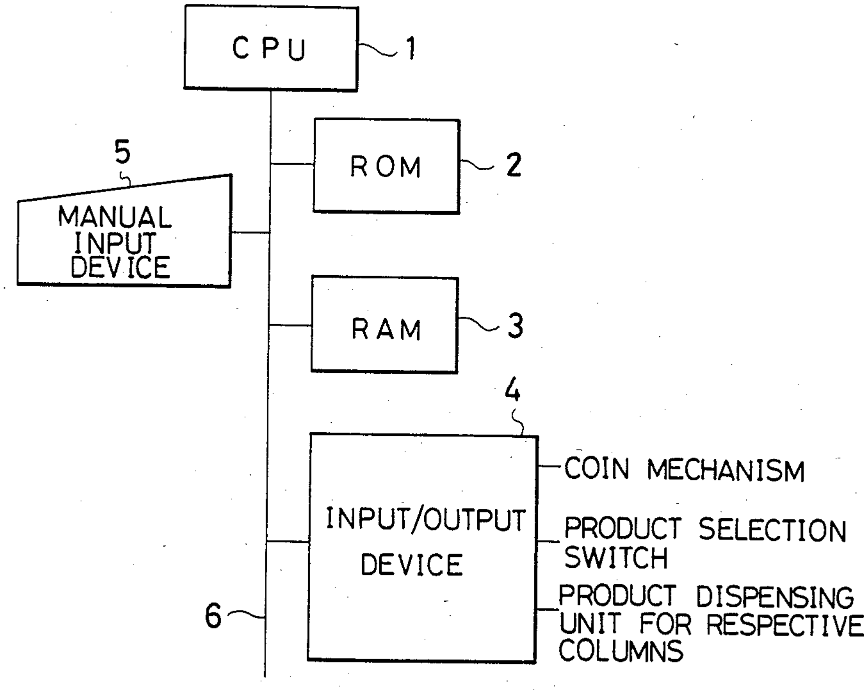
FIG. 1 is a block diagram of a controller of an automatic vending machine with a rotational dispensing function according to an embodiment of the present invention.

FIG. 1 is a block diagram showing a controller of an automatic vending machine which employs the present invention. In this embodiment, a microcomputer (to be referred to as a CPU) 1 performs the overall control of the machine. Reference numeral 2 denotes a ROM for storing a control program for controlling the overall operation of the automatic vending machine. The control program stored in the ROM 2 and the CPU 1 constitute the dispensing pattern calculating means, the discriminating means for discriminating the down counter having the maximum value, the detecting means for detecting zero counts of all the down counters, and the resetting means. Reference numeral 3 denotes a RAM constituting down counters for storing the product numbers of product storage columns Cl to Cn. The RAM 3 also stores calculated results. Reference numeral 4 denotes an input/output device connected to a coin mechanism for receiving coins and dispensing change, product selection switches and a product dispensing unit for the respective column. The input/output device 4 can be connected to a bill verifier as needed. Reference numeral 5 denotes a manual input device constituting the setting means for setting product numbers of the respective columns. Reference numeral 6 denotes a bus.

The operation of the controller of this embodiment will be described with reference to flow charts of FIGS. 2-A, 2-B and 2-C.

An operator stores products in the respective columns in the automatic vending machine and enters the product numbers thereof at the manual input device 5. The product numbers are stored in the RAM 3. The columns subject to rotational dispensing are set, and a dispensing pattern instruction is entered. In this embodiment, the products are dispensed in rotation from the columns C1 to C4.

The CPU 1 reads out the product numbers of the columns C1 to C4 from the RAM 3 (step 101) and calculates the dispensing product numbers of one dispensing pattern of the respective columns (step 102). The dispensing pattern is obtained such that the product numbers of the respective columns are divided by a given constant K (where K is an arbitrary value), the quotients are rounded to obtain integers, and "1" is added to the integers in the following manner:

$$(\text{product numbers}/K)+1 \qquad (1)$$

(the quotient is rounded).

The dispensing product numbers of the respective columns can be calculated by equation (1) and are stored in the RAM, and at the same time the calculated values are also set in column counters CC1 to CC4, respectively (step 103). A case will be exemplified assuming that 100 products are stored in the column C1; 100, in the column C2; 80, in the column C3; and 70, in the column C4; and the constant K is given as 10.

In this case, the dispensing product numbers of one dispensing pattern are preset as 11, 11, 9, and 8 respectively in the columns C1, C2, C3 and C4, and counts of the column counters CC1 to CC4 are set to be 11, 11, 9 and 8, respectively (see the dispensing pattern table in FIG. 3).

The CPU 1 checks in steps 104 to 107 whether or not empty switches E1 to E4 as the sold-out detecting means which are turned on when no products are left in the columns C1 to C4 are turned on. If YES in steps 104, 105, 106 and 107, the counts of the column counters CC1 to CC4 corresponding to the empty switches E1 to E4 are selectively reset to zero (steps 108 to 111). In this case, when the CPU 1 determines that all the empty switches E1 to E4 are turned on (step 112), sold-out processing (step 113) is performed. However, if NO in all steps 104 to 107, the flow advances to processing of FIG. 2-B. When the products are filled in the respective columns, the empty switches E1 to E4 are kept off, and the CPU 1 executes processing after step 114 of FIG. 2-B. When a coin or coins are inserted and a product selection switch is depressed, the CPU 1 checks whether or not product sale operation is performed (step 114). If YES in step 114, the CPU 1 detects one of the column counters CC1 to CC4 which has a maximum value in steps 115 to 120. The products are dispensed from one of the columns C1 to C4 which corresponds to the column counter having the maximum value. It should be noted that when more than one of the column counters CCI to CC4 have a maximum value, a priority order is determined and the products are dispensed in accordance with the priority order. In this embodiment, the priority order is given as an order of C1, C2, C3 and C4. More particularly, when the products are to be dispensed from the column C1 (step 121), i.e., when the count of the column counter CC1 is larger than those of the column counters CC2, CC3 and CC4 (steps 115, 116 and 117), the dispensing unit of the column C1 is actuated to dispense the products from the column C1 (step 121). The count of the column counter CC1 is decremented by one (step 122). When the products are to be dispensed from the column C2, i.e., when the count of the column counter CC2 is larger than that of the column counter CC1 (step 115) and is also larger than those of the column counters CC3 and CC4 (steps 118 and 119), the products are dispensed from the column C2 (step 123), and the count of the column counter CC2 is decremented by one (step 124). When the products are to be dispensed from the column C3, i.e., when the count of the column counter CC3 is larger than those of the column counters CC1 and CC2 (steps 115, 116 and 118) and at the same time is larger than that of the column counter CC4 (step 120), the products are dispensed by the corresponding dispensing unit from the column C3 (step 125) and the count of the column counter CC3 is decremented by one. Furthermore, when the products are to be dispensed from the column C4, i.e., when the count of the column counter CC4 is larger than that of the column counter CC3 which is larger than those of the column counters CC1 and CC2 (step 120), is larger than that of the column counter CC1 which is larger than those of the column counters CC2 and CC3 (step 117), or is larger than that of the column counter CC2 which is larger than those of the column counters CC1 and CC3 (step 119), the dispensing unit for the column C4 is actuated to dispense the products from the column 4 (step 127). At the same time, the count of the column counter CC4 is decremented by one (step 128). The products are dispensed from the column corresponding to the column counter having the maximum value. Thereafter, the CPU 1 checks whether or not the counts of all the column counters CC1 to CC4 are zero (steps 130 to 133 of FIG. 2-C). If NO in steps 130 to 133, processing from step 104 is repeated.

The dispensing order of the dispensing pattern in the above case is shown in FIG. 3. Two products are alternately dispensed from the columns C1 and C2. When the counts of the column counters CC1, CC2 and CC3 are "9", one product is dispensed from each of the columns C1, C2 and C3 (5, 6 and 7 in FIG. 3). When the counts of the column counters CC1 to CC4 are set to "8", one product is dispensed from each of the columns C1 to C4 (8, 9, 10, 11, . . . , 36, 37, 38 and 39 in FIG. 3). When the counts of all the column counters CC1 to CC4 are set to zero (steps 130 to 133), i.e., when the 39th product is dispensed, the values calculated in step 102 are set again in the column counters CC1 to CC4, respectively (step 103). Thereafter, processing from step 104 is repeated. In this manner, the products are dispensed in rotation. When the product numbers of the respective columns become small in one dispensing pattern and the empty switches E1 to E4 are selectively turned on (steps 104 to 107), the column counters corresponding to the ON empty switches are reset to zero (steps 108 to 111). The counts of the column counters corresponding to the empty columns are set to zero, and no dispensing operation is performed.

In this manner, when all the empty switches E1 to E4 are turned on (step 112), sold-out processing (step 113) is performed.

What is claimed is:

1. An automatic vending machine for dispensing products in rotation from a plurality of columns, comprising: setting means for respectively setting product numbers of said plurality of columns in accordance with the numbers of products stored in said plurality of columns; dispensing pattern calculating means for calculating dispensing product numbers of said plurality of columns in accordance with the product numbers set by said setting means; down counters which are preset with values respectively corresponding to the dispensing product numbers calculated by said dispensing pattern calculating means and which are respectively decremented every time the products are dispensed from said plurality of columns; discriminating means for discriminating one of said down counters which has a maximum value; dispensing means for dispensing the products from a column corresponding to one of said down counters which is discriminated to have the maximum value by said discriminating means; detecting means for detecting zero counts of all of said down counters; and resetting means for resetting the values calculated by said dispensing pattern calculating means in said down counters to zero in response to an output from said detecting means.

2. A machine according to claim 1, wherein said discriminating means generates discrimination signals in accordance with a priority order when a plurality of said down counters have the maximum value.

3. A machine according to claim 1 or 2, further comprising sold-out detecting means provided for each of said plurality columns, said down counters being reset to zero when said sold-out detecting means detects a sold-out state.

* * * * *